(12) United States Patent
Broser

(10) Patent No.: US 7,743,724 B1
(45) Date of Patent: Jun. 29, 2010

(54) ANIMAL WARNING SYSTEM FOR VEHICLES

(76) Inventor: Philip Broser, 6349 Emerald Lake Dr., Troy, MI (US) 48085

( * ) Notice: Subject to any disclaimer, the term of this patent is extended or adjusted under 35 U.S.C. 154(b) by 0 days.

(21) Appl. No.: 12/111,289

(22) Filed: Apr. 29, 2008

(51) Int. Cl.
*A01M 29/02* (2006.01)
*G10K 5/00* (2006.01)

(52) U.S. Cl. ............... 116/137 R; 116/22 A; 340/384.1

(58) Field of Classification Search ............... 116/22 A, 116/24, 108, 137 R, 140, 142 FP, 137 A, 116/DIG. 18; 152/427, 429, 431; 340/384.1, 340/384.2
See application file for complete search history.

(56) References Cited

U.S. PATENT DOCUMENTS

| | | | |
|---|---|---|---|
| 1,726,243 A * | 8/1929 | Scott et al. ................. 116/34 R |
| 4,437,428 A | 3/1984 | Hoffelner | |
| 4,903,630 A | 2/1990 | Rezmer | |
| 5,365,967 A * | 11/1994 | Moore ......................... 137/226 |
| 5,418,518 A | 5/1995 | Schenken et al. | |
| 5,853,021 A * | 12/1998 | Grimes ........................ 137/230 |
| D415,240 S | 10/1999 | Jackson | |
| 6,056,411 A * | 5/2000 | Blevins ....................... 359/838 |
| 6,125,694 A * | 10/2000 | Bledsoe ..................... 73/146.8 |
| 6,677,853 B1 | 1/2004 | Canfield | |
| 6,832,574 B1 * | 12/2004 | Coconas .................... 116/58 R |
| 6,948,516 B1 * | 9/2005 | Williams ..................... 137/224 |
| 7,106,180 B1 | 9/2006 | Pompei | |
| 7,119,665 B2 * | 10/2006 | Albert ..................... 340/404.2 |
| 7,370,601 B1 * | 5/2008 | Williams .................. 116/22 A |

* cited by examiner

*Primary Examiner*—Amy Cohen Johnson
(74) *Attorney, Agent, or Firm*—Kyle Fletcher

(57) ABSTRACT

The invention is an ultrasonic whistle that screws onto the valve stem of a vehicle tire. A variety of alternative embodiments utilize a housing that screws onto the valve stem with variations as to how air travels across the whistle. As the vehicle's tires rotate, wind passes across the whistle, which in turn produces sound that is audible to animals and in turn alerts animals of the oncoming traffic.

4 Claims, 5 Drawing Sheets

ANIMAL WARNING SYSTEM FOR VEHICLES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of noise production devices that are suited to warning animals of oncoming vehicles.

B. Discussion of the Prior Art

As a preliminary note, it should be stated that there is an ample amount of prior art that deals with animal warning devices. As will be discussed immediately below, no prior art discloses an animal warning device that utilizes an ultrasonic whistle apparatus that attaches to the valve stem of a vehicle tire.

The Rezmer patent (U.S. Pat. No. 4,903,630) discloses an ultrasonic whistle apparatus that is mountable on a vehicle's exterior to warn animals of the approach of the vehicle. However, the whistle apparatus of the Rezmer patent does not rotates as the tire rotates.

The Hoffelner patent (U.S. Pat. No. 4,437,428) discloses a sound generating device that is actuated by wind for warning wild animals of approaching vehicles. However, the device of the Hoffelner patent does not attach to the air valve of a tire such that the device rotates as the tire rotates.

The Schenken et al. patent (U.S. Pat. No. 5,418,518) discloses an animal warning and deterring device which generates an audible tone. However, the device of the Schenken patent does not attach to the air valve of a tire such that the device rotates as the tire rotates.

The Pompei patent (U.S. Pat. No. 7,106,180) discloses an acoustic warning or alerting systems capable of producing highly directional audible sound. However, the warning or alerting systems of the Pompei patent does not utilize an ultrasonic whistle that attaches to the valve stem of a wheel.

The Canfield patent (U.S. Pat. No. 6,677,853) discloses a means of altering a standard motor vehicle horn in a manner such that the noise alerts animals, particularly deer, to the presence of an approaching vehicle. However, the means of the Canfield patent employs the horn on an existing motor vehicle as opposed to a device that screws upon the valve stem of a tire.

The Jackson patent (U.S. Pat. No. Des. 415,240) illustrates a design for an animal avoidance device, which does not depict the means by which the device attaches to a vehicle.

While the above-described devices fulfill their respective and particular objects and requirements, they do not describe an animal warning system that provides for the advantages of the animal warning system. In this regard, the animal warning system departs from the conventional concepts and designs of the prior art.

Therefore, a need exists for the animal warning system in which an ultrasonic whistle attaches to the valve stem of a vehicle's tire.

SUMMARY OF THE INVENTION

The invention is an ultrasonic whistle that screws onto the valve stem of a vehicle tire. A variety of alternative embodiments utilize a housing that screws onto the valve stem with variations as to how air travels across the whistle. As the vehicle's tires rotate, wind passes across the whistle, which in turn produces sound that is audible to animals and in turn alerts animals of the oncoming traffic.

An object of the invention is to provide an animal warning system that is easily installed on an existing vehicle.

It is a further object of the invention to provide an animal warning system that does not require an electrical, pneumatic, hydraulic, or mechanical powering means, but rather is powered by the air flow around a rotating tire.

It is a further object of the invention to provide an animal warning system that easily attaches to a vehicle's tire valve stem.

It is yet a further object of the invention to provide an animal warning system that is effective, easily installed, and affordable.

These together with additional objects, features and advantages of the animal warning system will be readily apparent to those of ordinary skill in the art upon reading the following detailed description of presently preferred, but nonetheless illustrative, embodiments of the animal warning system when taken in conjunction with the accompanying drawings.

In this respect, before explaining the current embodiments of the animal warning system in detail, it is to be understood that the animal warning system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the animal warning system. It is therefore important that the claims be regarded as including such equivalent construction insofar as they do not depart from the spirit and scope of the animal warning system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
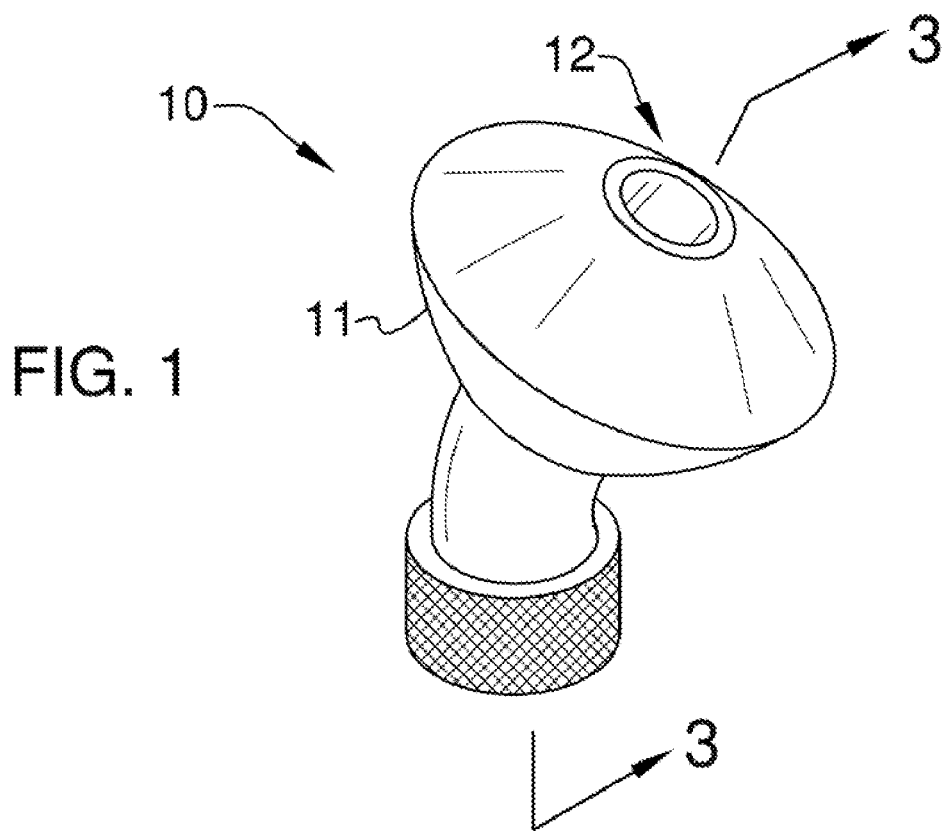
FIG. 1 illustrates a front, isometric view of a main embodiment invention.
Figure 2:
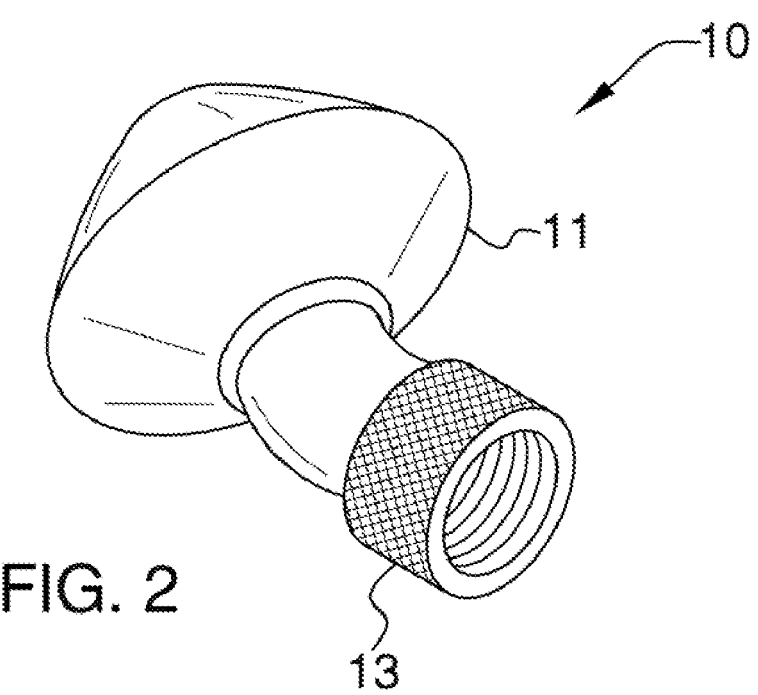
FIG. 2 illustrates a rear, isometric view of the main embodiment of the invention.
Figure 3:
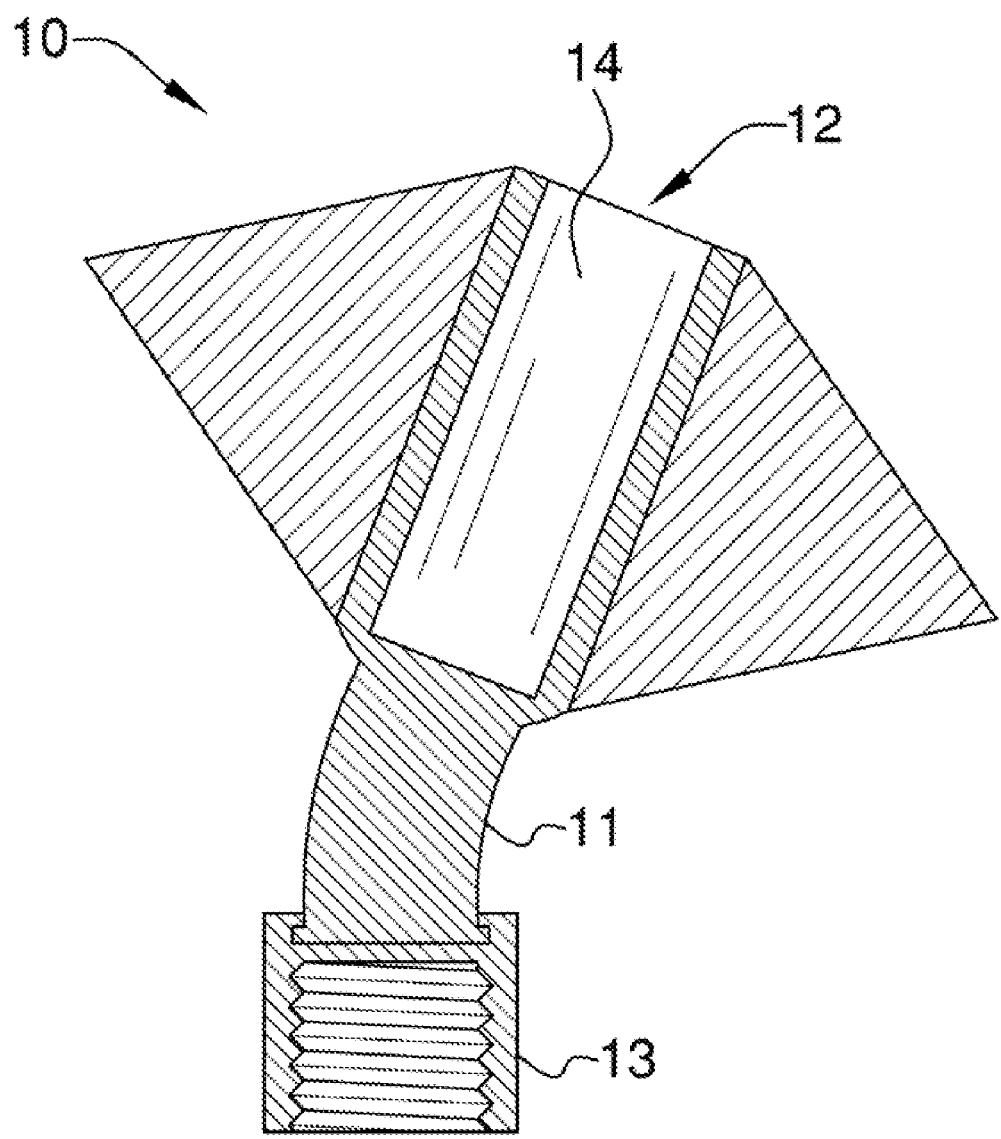
FIG. 3 illustrates a cross-sectional view of the main embodiment along line 3-3 in FIG. 1.

Detailed reference will now be made to the main embodiment of the present invention, examples of which are illustrated in FIGS. 1-4. An ultrasonic whistle 10 (hereinafter invention) includes a housing 11 that has a side holes 12. The side hole 12 is directed towards the center of the housing 11. The housing 11 is affixed by a fastening means to a valve cap 13, which screws onto a valve stem 50 of a tire 51. The fastening means comprises gluing, molding, casting, welding, or screwing.

It shall be noted that for the invention 10, and all subsequent embodiments, the housing 11 and the valve cap 13 may be comprised of a single piece, as opposed to two parts as currently depicted.

The side hole 12 enters into a resonating chamber 14 with the housing 11. Air crosses the top of the housing 11 and across the side hole 12 and resonating chamber 14, which generates a whistling sound 99.

Figure 4:
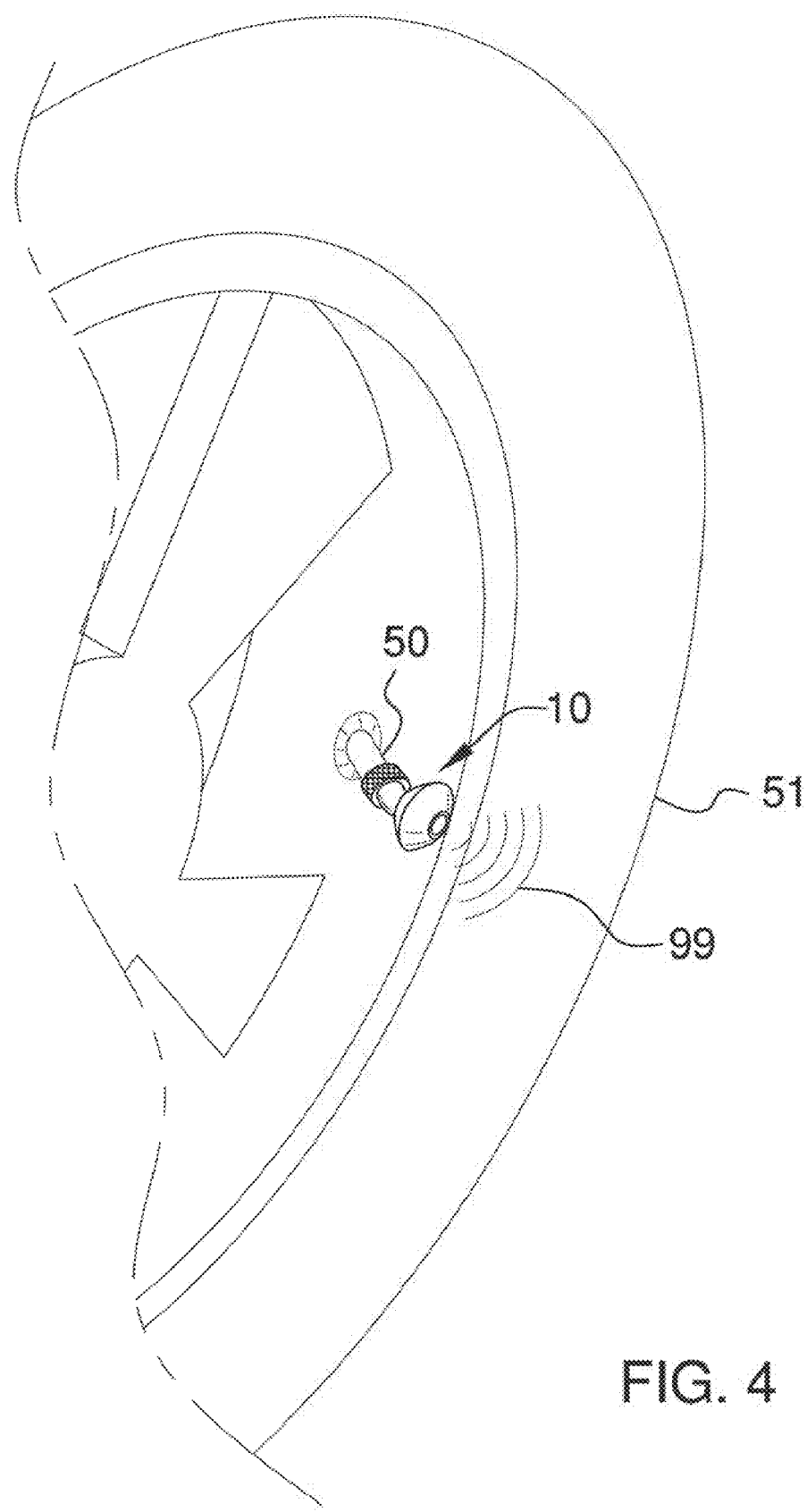
FIG. 4 illustrates a view of the invention installed on a valve stem of a tire.
Figure 5:
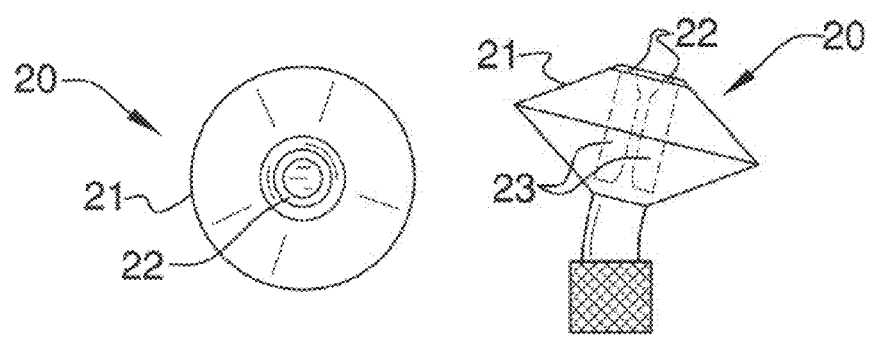
FIG. 5 illustrates a top and side view with hidden lines of a second embodiment.

Referring to FIG. 5, a second embodiment 20 includes a housing 21 that has a side hole 22, which forms a resonating chamber 23 within the housing 21. Referring to FIG. 4, the side hole 22, in conjunction with the resonating chamber 23, create the whistling sound 99 as air passes across the side hole 22.

It shall be noted that the second embodiment 20 has an optimal audible range of speed of 30 to 40 miles per hour.

Figure 6:
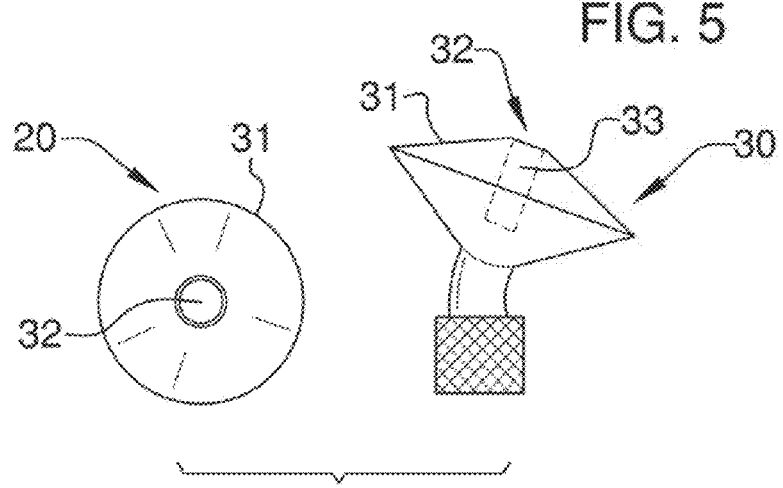
FIG. 6 illustrates a top and side view with hidden lines of a third embodiment.

Referring to FIG. 6, a third embodiment 30 includes a housing 31 that has a side hole 32 that enters into a resonating chamber 33. Referring to FIG. 4, the side hole 32, in conjunction with the resonating chamber 33, create the whistling sound 99 as air passes across the side hole 32.

It shall be noted that the third embodiment 30 has an optimal audible range of speed of 30 to 40 miles per hour.

Figure 7:
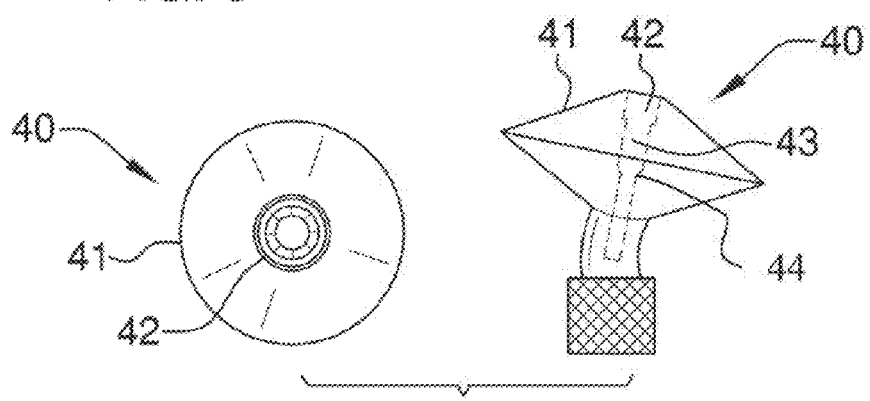
FIG. 7 illustrates a top and side view with hidden lines of a fourth embodiment.

Referring to FIG. 7, a fourth embodiment 40 includes a housing 41 that has a side hole 42 that enters into a resonating chamber 43. Please note that the resonating chamber 43 has a plurality of steps 44 located within, and of which create different acoustical features when operating the fourth embodiment 40 at different speeds. Referring to FIG. 4, the side hole 42, in conjunction with the resonating chamber 43, create the whistling sound 99 as air passes across the side hole 42.

It shall be noted that the fourth embodiment 40 has an optimal audible range of speed of 30 to 50 miles per hour.

Figure 8:
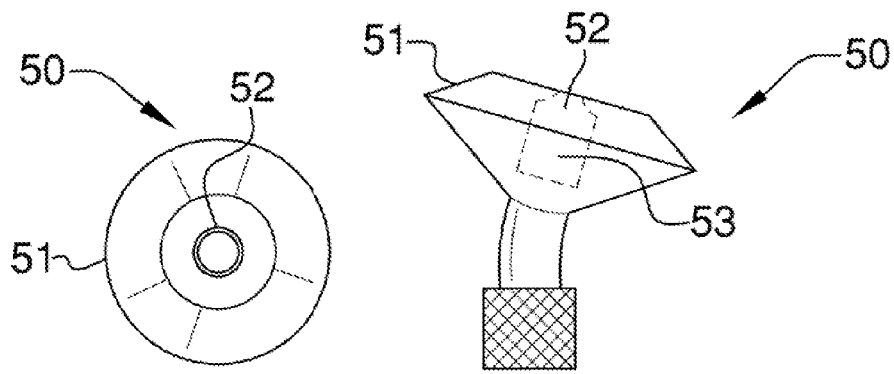
FIG. 8 illustrates a top and side view with hidden lines of a fifth embodiment.

Referring to FIG. 8, a fifth embodiment 50 includes a housing 51 that has a side hole 52 that enters into a resonating chamber 53. Please note that the resonating chamber 53 opens to a larger diameter than the side hole 52, which produces different acoustical effects when operating the fifth embodiment 50 at different speeds. Referring to FIG. 4, the side hole 52, in conjunction with the resonating chamber 53, create the whistling sound 99 as air passes across the side hole 52.

It shall be noted that the fifth embodiment 50 has an optimal audible range of speed of 30 to 35 miles per hour.

Figure 9:
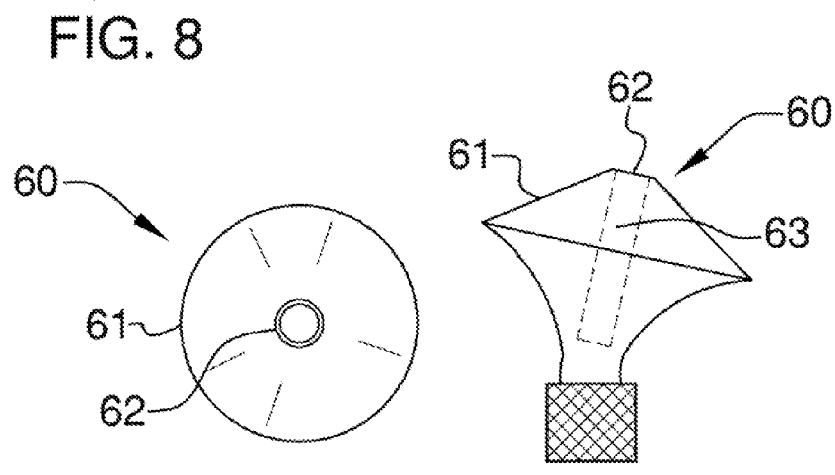
FIG. 9 illustrates a top and side view with hidden lines of a sixth embodiment.

Referring to FIG. 9, a sixth embodiment 60 includes a housing 61 that has a side hole 62 that enters into a resonating chamber 63. Please note that the resonating chamber 63 has a lengthened shape, which produces different acoustical effects when operating the sixth embodiment 60 at different speeds. Referring to FIG. 4, the side hole 62, in conjunction with the resonating chamber 63, create the whistling sound 99 as air passes across the side hole 62.

It shall be noted that the sixth embodiment 60 has an optimal audible range of speed of 30 miles per hour.

Figure 10:
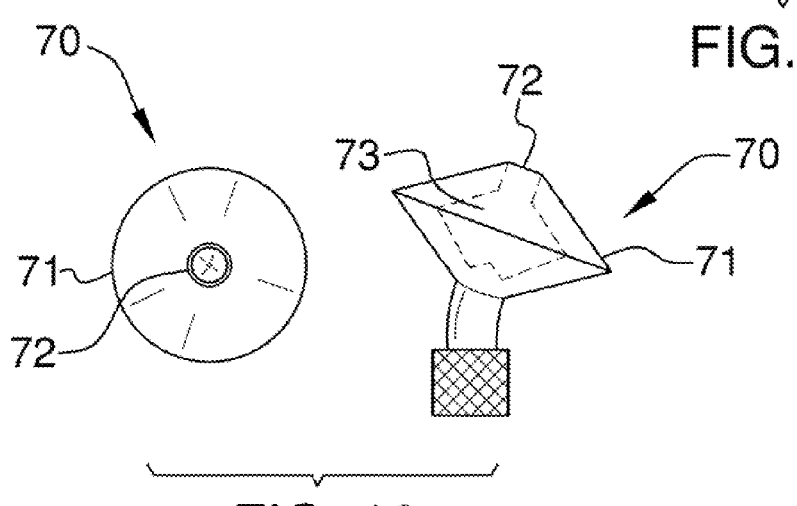
FIG. 10 illustrates a top and side view with hidden lines of a seventh embodiment.

Referring to FIG. 10, a seventh embodiment 70 includes a housing 71 that has a side hole 72 that enters into a resonating chamber 73. Please note that the resonating chamber 73 opens to mimic the exterior shape of the housing 71, which produces different acoustical effects when operating the seventh embodiment 70 at different speeds. Referring to FIG. 4, the side hole 72, in conjunction with the resonating chamber 73, create the whistling sound 99 as air passes across the side hole 72.

It shall be noted that the seventh embodiment 70 has an optimal audible range of speed of 20 to 60 miles per hour.

It shall be noted that the third embodiment 30 has an optimal audible range of speed of 30 to 40 miles per hour.

The invention 10 and all accompanying embodiments (20-70), may be made from a material comprising plastic, metal, glass, or a wood.

Referring to FIGS. 1-10, please note that the invention 10 and all accompanying embodiments (20-70), show an angle along the respective housings 11, 21, 31, 41, 51, 61, and 71. Said angle has a range of 5 to 75 degrees.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A whistle that attaches to a valve stem of a tire comprising:
    (a) a housing;
        wherein the housing attaches to the valve stem of a tire by an attaching means;
        wherein the attaching means involves an opening with internal threading that corresponds with the external threading of a valve stem of a tire;
    (b) a side hole;
        wherein the side hole is located along a surface of the housing;
        wherein said side hole opens into a resonating chamber;
        wherein the resonating chamber generates a whistle sound as air passes from the exterior of said housing and into the side hole upon the rotation of a tire; and
        wherein said whistle sound is an alarm to animals and people of an approaching vehicle.

2. The ultrasonic whistle as described in claim 1 wherein the housing is made from a material comprising plastic, metal, wood, or a glass.

3. A whistle that attaches to a valve stem of a tire comprising:
    (a) a housing;
    (b) a valve cap;
        wherein the housing attaches to the valve cap by a fastening means;
        wherein the valve cap attaches to the valve stem of a tire by an attaching means;

wherein the attaching means involves an opening with internal threading that corresponds with the external threading of a valve stem of a tire;

(c) a side hole;

wherein the side hole is located along a surface of the housing;

wherein said side hole opens into a resonating chamber;

wherein the resonating chamber generates a whistle sound as air passes from the exterior of said housing and into the side hole upon the rotation of a tire; and wherein said whistle sound is an alarm to animals and people of an approaching vehicle.

4. The ultrasonic whistle as described in claim 3 wherein the housing and outer housing is made from a material comprising plastic, metal, wood, or a glass.

* * * * *